(12) United States Patent
Simonis et al.

(10) Patent No.: US 12,469,341 B2
(45) Date of Patent: Nov. 11, 2025

(54) METHOD AND APPARATUS FOR DETERMINING A RESIDUAL SERVICE LIFE BASED ON A PREDICTIVE DIAGNOSIS OF COMPONENTS OF AN ELECTRIC DRIVE SYSTEM USING ARTIFICIAL INTELLIGENCE TECHNIQUES

(71) Applicant: Robert Bosch GmbH, Stuttgart (DE)

(72) Inventors: Christian Simonis, Leonberg (DE); Christoph Woll, Gerlingen (DE); Kirill Gorelik, Stuttgart (DE); Tunan Shen, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 615 days.

(21) Appl. No.: 17/486,093

(22) Filed: Sep. 27, 2021

(65) Prior Publication Data
US 2022/0101666 A1 Mar. 31, 2022

(30) Foreign Application Priority Data
Sep. 29, 2020 (DE) ...................... 10 2020 212 277.6

(51) Int. Cl.
*G07C 5/08* (2006.01)
*G06N 3/02* (2006.01)

(52) U.S. Cl.
CPC ............. *G07C 5/0816* (2013.01); *G06N 3/02* (2013.01); *G07C 5/0808* (2013.01)

(58) Field of Classification Search
CPC ...... G07C 5/0816; G07C 5/0808; G06N 3/02; G06N 3/045; G06N 20/00; G06N 3/08; B60L 2240/70; B60L 2260/46; B60L 2260/50; B60L 3/0023; B60L 58/16;
(Continued)

(56) References Cited

U.S. PATENT DOCUMENTS

| 6,393,373 B1 * | 5/2002 | Duyar .................. G01R 31/343 |
| | | 702/58 |
| 8,996,241 B2 | 3/2015 | Uchida |
| 2017/0063276 A1 * | 3/2017 | Zhi ....................... G01R 31/343 |

(Continued)

FOREIGN PATENT DOCUMENTS

DE         100 62 606 A1    6/2002

*Primary Examiner* — Anne Marie Antonucci
*Assistant Examiner* — Jodi Jones
(74) *Attorney, Agent, or Firm* — Maginot, Moore & Beck LLP

(57) ABSTRACT

A computer-implemented method for providing a residual service life based on a diagnosis of components of an electric drive system in a vehicle, includes recording distributions of a plurality of operating parameters comprising at least one sensor parameter and/or at least one control parameter, in the vehicle; using a plurality of diagnostic models for a plurality of fault types, each of which is configured to detect a specific fault type in one of the components based on at least some of the plurality of operating parameters and to signal corresponding fault information associated with the fault type; determining the residual service life using a residual usage model depending on the signaled corresponding fault information, the residual usage model configured to indicate the residual service life depending on the corresponding fault information from the plurality of diagnostic models; and signaling the residual service life.

12 Claims, 3 Drawing Sheets

(58) Field of Classification Search
CPC ....... B60W 2050/021; B60W 2556/45; B60W 2556/55; B60W 50/0205
USPC ........ 701/31.4, 1, 29.1, 36, 34.4, 29.4, 34.3, 701/31.7, 31.9, 43, 29.9, 76, 92, 39
See application file for complete search history.

(56) References Cited

U.S. PATENT DOCUMENTS

| | | | |
|---|---|---|---|
| 2018/0257663 A1* | 9/2018 | Jiang | G06F 11/3452 |
| 2018/0285772 A1* | 10/2018 | Gopalan | G06N 7/01 |
| 2019/0042675 A1* | 2/2019 | Martin | G06N 20/00 |
| 2019/0228312 A1* | 7/2019 | Andoni | G06F 18/2433 |
| 2020/0184742 A1* | 6/2020 | Jiang | G07C 5/0808 |
| 2021/0073063 A1* | 3/2021 | Kale | G06F 11/3058 |
| 2021/0264285 A1* | 8/2021 | Takahashi | G08B 5/22 |
| 2022/0341972 A1* | 10/2022 | Chishiki | G01R 31/343 |

* cited by examiner

METHOD AND APPARATUS FOR DETERMINING A RESIDUAL SERVICE LIFE BASED ON A PREDICTIVE DIAGNOSIS OF COMPONENTS OF AN ELECTRIC DRIVE SYSTEM USING ARTIFICIAL INTELLIGENCE TECHNIQUES

This application claims priority under 35 U.S.C. § 119 to patent application no. DE 10 2020 212 277.6, filed on Sep. 29, 2020 in Germany, the disclosure of which is incorporated herein by reference in its entirety.

FIELD

The disclosure relates to motor vehicles with electric drive systems, and in particular to methods for providing an indication of a residual service life based on a diagnosis of components of the electric drive system using artificial intelligence techniques.

BACKGROUND

An electric drive system comprises numerous components, such as an electrical energy storage system, e.g. a traction battery, an electric machine for converting between mechanical and electrical energy, a power electronics unit for controlling the electric machine, and mechanical components such as a gearbox and differential for torque transmission, as well as wheel bearings for mounting drive wheels, and the like.

Methods for monitoring the state of health of individual components as well as diagnostic methods for detecting faults in individual components are known from the prior art. For example, in the electric drive system, the traction battery is continuously monitored based on predefined methods using operating parameters, i.e. sensor parameters and control parameters. For other components, however, monitoring and diagnosis during operation is inadequately provided.

As a rule, using standard diagnostic procedures, faults in the drive system are only detected after damage to the drive system has occurred. However, advance notice of age- and wear-related faults is provided by changes in operating behavior and system states. If the fault then occurs, this often leads to a performance reduction or total failure of the drive system.

SUMMARY

The disclosure provides a method for providing a residual service life based on a diagnosis of components of an electric drive system in a motor vehicle, and a method for training a data-based residual usage model, a corresponding apparatus and a drive system.

A first aspect relates to a computer-implemented method for providing a residual service life based on a diagnosis of components of an electric drive system in a vehicle, having the following steps:

recording distributions of a plurality of operating parameters comprising at least one sensor parameter and/or at least one control parameter, in the vehicle;

using a plurality of diagnostic models for a plurality of fault types, each of which is designed to detect a specific fault type in one of the components based on at least some of the plurality of operating parameters and to signal appropriate fault information associated with the fault type;

determining a residual service life using a trained, data-based residual usage model depending on the signaled fault information of the plurality of diagnostic models, wherein the data-based residual usage model is trained to indicate a residual service life depending on fault information from a plurality of diagnostic models;

signaling the residual service life.

The fault type here corresponds to a specific fault that has occurred in a particular component. In a component, different faults can be defined as different fault types. The fault information can include an indication that a fault has occurred or that no fault has occurred. The fault information can also include an indication of the severity of the fault.

The operating parameters correspond to parameters of the drive system from ongoing operation, such as sensor parameters and control parameters for actuators and parameters derived from them and the like.

In addition, the diagnostic models can comprise one or more physical diagnostic models, each of which is designed to detect a fault in one or more of the components of the electric drive system based on correlated and/or redundant distributions of at least some of the plurality of operating parameters and to provide corresponding fault information. A physical diagnostic model is used to evaluate the operating parameters and to assess diagnosable fault types by applying domain knowledge. Such a diagnostic model is implemented in the motor vehicle and can use, in particular, redundant or correlated operating parameters to detect a fault, in particular in conjunction with pinpointing.

Alternatively or in addition, the plurality of diagnostic models can comprise one or more data-based fault classification models which are designed to detect a fault in one or more of the components based on the distribution of at least some of the plurality of operating parameters and to signal corresponding fault information.

By using data-based fault classification models as diagnostic models (machine-learning models), additional diagnoses can be carried out with regard to known fault types. In particular, a data-based classification model can be used, e.g. in the form of a neural network or the like, which can also be implemented in the motor vehicle for the analysis and evaluation of classifiable fault types. The output of the fault classification model is also a fault information item indicating a fault type of a detected fault. Such a classification model can be used, for example, as a supplement to the physical diagnostic model to improve diagnostic coverage. A data-based fault classification model can also specify a fault severity.

The fault classification model can be trained by means of fleet data in a central unit (cloud) based on a large amount of training data. This training data for training this fault classification model is based on faults of a certain fault type detected in a plurality of vehicles, together with associated operating parameters which indicate the status of the drive system which characterizes the fault type. The model parameters of the fault classification model trained in this way can then be transmitted to the motor vehicle once or at regular intervals.

It can be provided that the plurality of diagnostic models comprise one or more anomaly detection models which are designed to detect an anomaly in the behavior of the drive system based on the distribution of at least some of the plurality of operating parameters, and to provide an appropriate degree of anomaly as fault information.

It can be provided that, using the data-based residual usage model, the residual service life is indicated as fault information depending on the one or more degrees of anomaly.

A data-based anomaly detection model can detect behavioral deviations in a component of the drive system, in particular including behavioral deviations that do not lead to detection of a fault by other diagnostic models. Thus, behavioral deviations can now be detected that cannot be detected by the physical diagnostic model or the fault classification model. The anomaly detection model can be implemented with an autoencoder that outputs a degree of anomaly, e.g. as a reconstruction error, in a known manner.

The anomaly detection model can be trained with operating parameters or distributions of operating parameters from ongoing operation in different operating ranges of a drive system with reliably fault-free components. In this way, behavior patterns of the drive system can be embedded in the anomaly detection model. The anomaly detection model can be implemented in the motor vehicle. The training of the anomaly detection model can preferably be performed in the central unit, in particular on the basis of the behavior patterns of many motor vehicles with reliably fault-free components. The model parameters of the anomaly detection model trained in this way can then be transmitted to the motor vehicle once or at regular intervals.

In particular, the respective fault information can be assigned to a critical or non-critical fault in the relevant component of the drive system, wherein when a critical fault is detected by an appropriate fault information item an end of the service life is signaled.

In addition, when a non-critical fault is signaled by the fault information, timing information is assigned to the fault, which specifies when the non-critical fault occurred, wherein the timing information is used for determining the residual service life, wherein in particular the timing information is supplied to the residual usage model as an input variable.

According to one embodiment the fault information items can be continuously transmitted to a central unit of one or a plurality of motor vehicles, wherein if a critical fault occurs that indicates the end of a service life, one or more training datasets are generated which assigns fault information of the plurality of diagnostic models to a residual service life, wherein the data-based residual usage model is retrained or updated with the one or more training datasets.

In principle, various diagnostic methods are known for verifying the functionality of different components in a motor vehicle. These diagnostic methods can perform diagnostics based on models such as a physical diagnostic model, a data-based fault classification model, or an anomaly detection model.

By means of the data-based residual usage model, the current state of health of the entire drive system can be assessed by using diagnosed faults and, if possible, changes in behavior. The state of health is indicated as a residual service life. The residual service life can be expressed as an estimated remaining operating time of the drive system until a failure is likely, or in other ways that can be used to determine the residual service life.

In particular, the data-based residual usage model can also be used to evaluate fault patterns of non-critical faults in which no or only some of the above diagnostic models have detected faults. For example, in the event of a suspected fault in the vehicle, which is present when the implemented diagnostic models for a fault type provide contradictory fault information, a substantiated indication of the residual service life can be made by the data-based residual usage model.

For this purpose, previous and known fault cases are determined in the cloud on the basis of similarity conditions using clustering methods. These known and similar fault cases have already been assessed in terms of their severity and residual service life. This makes it possible to derive the expected value and the scatter both in terms of the severity of the fault and the residual service life due to the fault.

The various diagnostic approaches continuously evaluate operating parameters to determine a probability of the existence of an actual fault and from this to derive measures as appropriate and/or to determine a residual service life of a relevant component. By combining conventional diagnostic methods with the use of fleet data in a central unit, domain knowledge and data knowledge can be combined in a model-based approach, thus increasing robustness, in particular in the case of conflicting and unclear diagnostic states. In this way, a reliable diagnosis can be made at a very early stage.

The residual service life can be determined using a data-based residual usage model which maps the residual service life to the fault information accordingly.

Alternatively, the residual usage model can use a clustering method, for example using a nearest neighbor approach, based on stored datasets that assign a residual service life to fault information for all types of faults considered for a wide range of vehicles. The residual service life is derived from a time at which the fault information changes and a detected time of occurrence of a critical fault. This means it is possible to evaluate the expected value and the scatter of the residual service life by statistically fitting a probability density from similar damage profiles. This allows a statistically quantified prediction of the residual service life.

A further aspect relates to an apparatus for providing a residual service life based on a diagnosis of components of an electric drive system in a vehicle, wherein the apparatus is designed for:
  recording distributions of a plurality of operating parameters comprising at least one sensor parameter and/or at least one control parameter, in the vehicle;
  using a plurality of diagnostic models for a plurality of fault types, each of which is designed to detect a specific fault type in one of the components based on at least some of the plurality of operating parameters and to signal appropriate fault information associated with the fault type;
  determining a residual service life using a residual usage model depending on the signaled fault information of the plurality of diagnostic models, the residual usage model being designed to indicate a residual service life depending on fault information from a plurality of diagnostic models; and signaling the residual service life.

BRIEF DESCRIPTION OF THE DRAWINGS

Embodiments are explained below with reference to the attached drawings. In the drawings.

DETAILED DESCRIPTION

Figure 1:
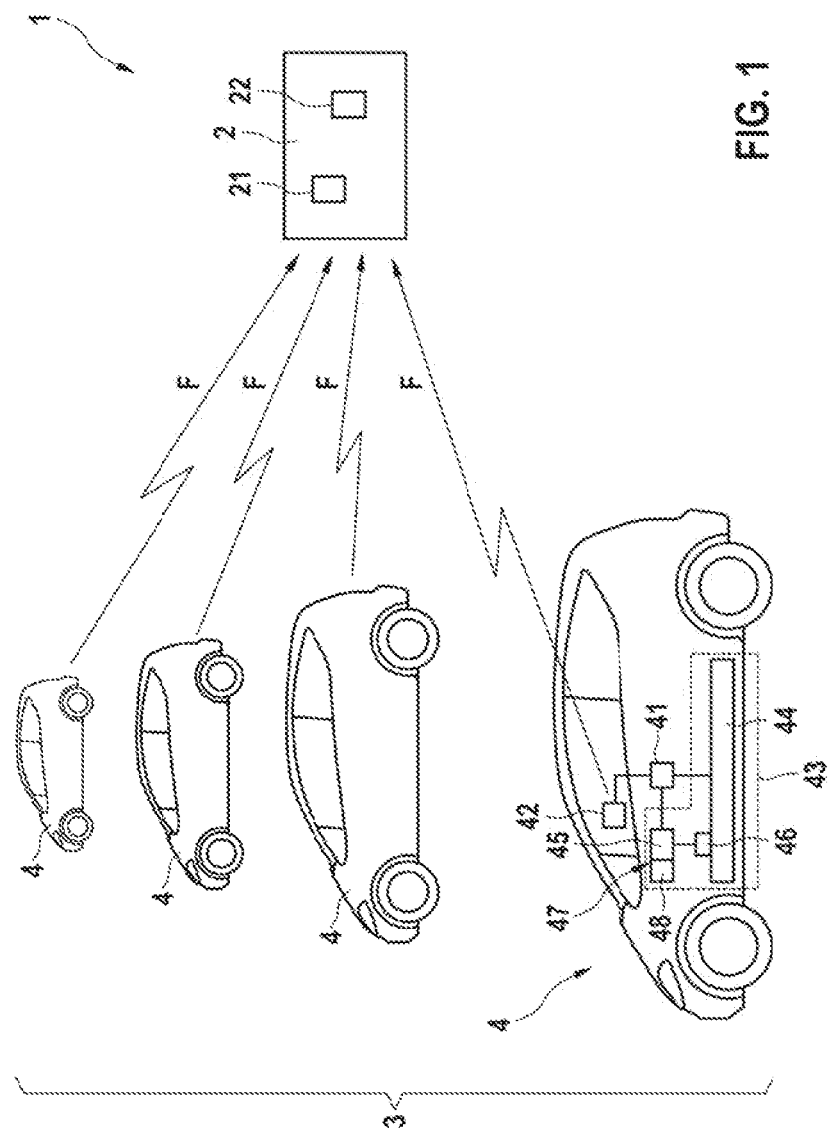
FIG. 1 shows a schematic representation of a system with a fleet of vehicles and a central unit for detecting faults in a drive system of the motor vehicles.

FIG. 1 shows a schematic illustration of a system 1 with a vehicle fleet 3 consisting of a plurality of vehicles 4, and a central unit 2. Each of the vehicles 4 is in communication with the central unit 2.

For this purpose, each of the vehicles 4 comprises a control unit 41 which is in communication with the central unit 2 via a communication device 42.

The vehicles 4 are operated via a drive system 43 comprising numerous components, such as an electrical energy storage system 44, e.g. a traction battery, an electric machine 45 for converting between mechanical and electrical energy, a power electronics unit 46 for controlling the electric machine 45, and mechanical components 47 such as a gearbox and differential for torque transmission, as well as wheel bearings for mounting drive wheels, and the like. In addition, a sensor system 48 can be provided to detect sensor parameters as operating parameters F. The operating parameters F comprise the sensor parameters and control parameters which are used to control actuators in the drive system 43.

The control unit 41 is designed to control the drive system 43 for operating the drive system. The control unit 41 can also be designed to perform diagnostic procedures.

The central unit 2 is in communication with all vehicles and comprises a control unit 21 and a database 22 for storing datasets.

Figure 2:
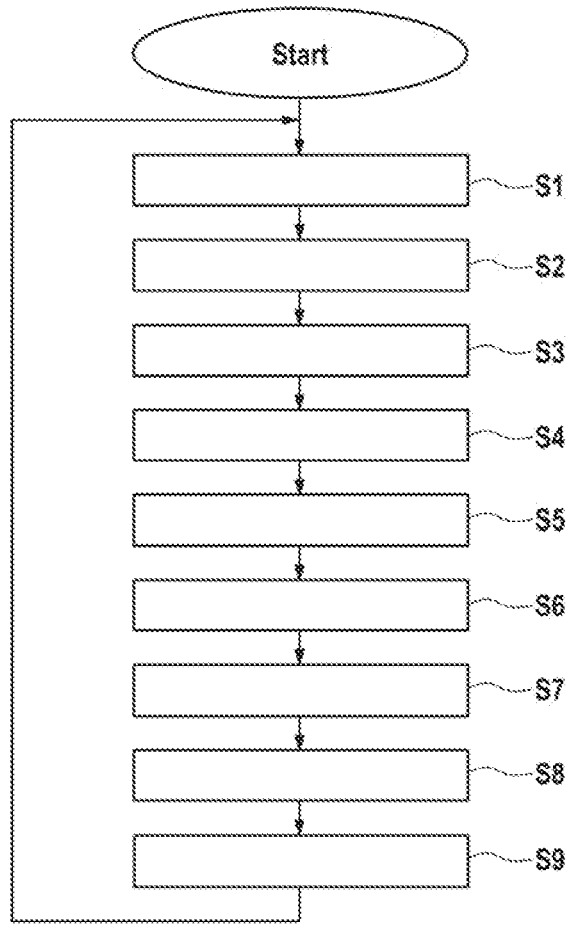
FIG. 2 shows a flowchart illustrating a method for diagnosing components of a drive system.
Figure 3:
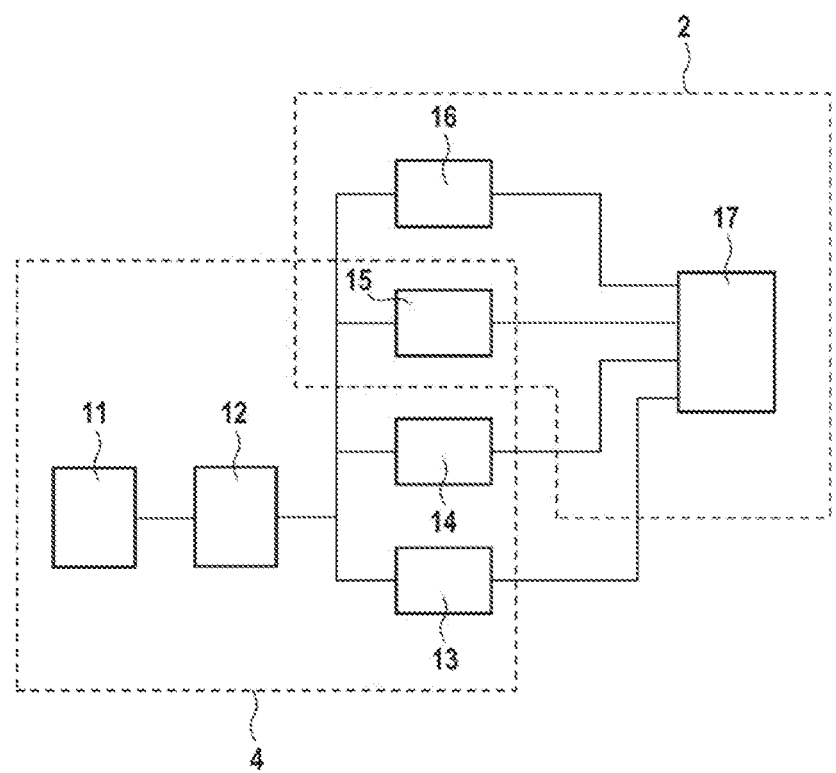
FIG. 3 shows a block diagram illustrating the diagnostic system in a motor vehicle and a central unit.

In conjunction with the block diagram of a diagnostic system 10 of FIG. 3, in FIG. 2 a flowchart illustrating a method for diagnosing the drive system 43 of a motor vehicle 4 is described in more detail, as can be implemented in the control unit 41 in conjunction with the central unit 2.

The method can be implemented in hardware or software in the control units 21, 41 of the central unit or of the vehicle. Essentially, the diagnostic system 10 has the structure as shown in FIG. 3.

The diagnostic system 10 comprises an operating parameter acquisition unit 11 for supplying operating parameters F which comprise sensor parameters from various sensors of the sensor system 48 in the drive system 43 and control parameters that are output to actuators of the drive system 43. In addition, the operating parameters F can comprise parameters derived from them, such as average values, temporal averages, gradients, and the like. The operating parameters from the drive system 43 of the vehicle are continuously acquired in step S1, so that chronological profiles of the operating parameters F are available.

The operating parameters F are pre-processed in step S2 in a pre-processing block 12. In this process, outliers are eliminated, the distributions of the operating parameters F are smoothed and possibly prepared for further evaluation, for example by normalization, transformation and the like.

The operating parameters F prepared in this way are fed to various fault diagnosis models. These usually comprise a plurality of physical diagnostic models 13, only one of which is shown for the sake of clarity. Physical diagnostic models can be created and deployed with the aid of domain knowledge for the analysis and evaluation of diagnosable fault types. With the physical diagnostic model 13, a fault can be detected in one or more components of the drive system 43 based on physical dependencies between redundant or correlated operating parameters F. In this way, a range of different fault types can be detected in the plurality of components of the drive system 43 and corresponding fault information can be output. The fault information indicates whether or not a fault has been detected by the associated physical diagnostic model 13.

In step S3, a fault is detected in the components of the drive system 43 using the physical diagnostic model 13 and corresponding fault information is supplied.

Furthermore, a data-based fault classification model 14 can be provided, which in step S4 can use classification methods to determine a fault in one or more components of the drive system 43 based on the distributions of the operating parameters F and can provide corresponding fault information. The fault classification model 14 (only one is shown here for clarity) can be trained based on operating parameters F and/or distributions of operating parameters F for a fault-free drive system 43. The fault classification model can be based on a Gaussian process model, a neural network, or similar.

The physical diagnostic model 13 and the fault classification model 14 can be implemented in the control unit 41 of the vehicle. These can perform fault diagnostics and signal the corresponding fault information.

As an alternative or in addition to the fault classification model, a fleet classification model 16 can be provided in the central unit 2, which can be designed essentially in a similar way to the fault classification model 14. The fleet classification model 16 can be data-based, e.g. implemented as a Gaussian process model or neural network, and is trained with fleet data in order to detect fault patterns that have occurred in different vehicles 4 of the fleet 3, while the fault detection model can only detect fault patterns of the respective ego vehicle. Using the fleet classification model 16, faults in components of the drive system that correspond to a known fault pattern can also be detected and supplied. This is effected by accordingly supplying fault information for each fault type to be detected.

Furthermore, in step S5 the prepared operating parameters F, or the distributions of the operating parameters, and the fault information of the physical diagnostic models 13 and of the fault classification models 14 are transmitted to the central unit 2.

Using an anomaly detection model 15 which can be implemented in both the central unit 2 or the control unit 41, in step S6 anomalies in the distributions of the operating parameters F can be detected without these being able to be assigned to a specific fault or specific fault type. These anomalies indicate abnormal behavior patterns of the drive system 43.

An anomaly detection is usually carried out based on an autoencoder which is trained using normal data (operating parameters for fault-free components of the drive system). The normal data is mapped into a reduced feature space from which the operating parameters can be reconstructed again. Sets of operating parameters F in which the reconstructed operating parameters F differ from the original operating parameters indicate an anomaly. The degree of deviation can indicate the degree of the anomaly. The degree of anomaly is supplied in the central unit 2 as fault information.

Data-based diagnostic procedures, which are used for the fault classification model 14 and the fleet classification model 16 for example, can be used to analyze and quantify known fault types. If a fault is detected, depending on the classification model used, a confidence level, which indicates the reliability with which the presence or absence of the fault was detected, can be specified with the fault information.

Each of the diagnostic models described above can be assigned to one of the components of the drive system 43 in order to detect a fault type in the corresponding component.

In step S8, detected faults from the models 13-16 are fed to a fusion block 17 which performs a fault evaluation using a residual usage model.

In step S9, a residual usage model is used to map the fault information to a residual service life in the fusion block 17. The residual service life is preferably determined depending on a state change of the fault information, so that the residual service life can be derived as a function of the determined residual service life and the time elapsed since the state change.

The residual service life can be determined using a clustering method, for example, by a nearest neighbor approach. For this purpose, an evaluation is carried out with datasets of fault information stored in the database 22 and on the basis of a critical fault that has occurred as a result, which signals the end of the service life. Thus, the datasets can assign a combination of all fault information from a vehicle to a residual service life by determining the period of time between the occurrence of a change of state of the fault information (for example, after detection of a non-critical fault, a threshold value being exceeded by the degree of anomaly and the like) and the occurrence of a critical fault as the residual service life.

It is then possible to evaluate the expected value and the scatter of the residual service life by using the clustering method to statistically fit a probability density from similar damage profiles. This allows a statistically quantified prediction of the residual service life.

Alternatively, the datasets can also be used to train a data-based residual usage model in the form of a regression model, such as a Gaussian process model, or a neural network. Such a data-based residual usage model can then be evaluated using the fault information supplied in order to obtain a residual service life. As above, the training can be carried out in such a way that the residual service life is specified in relation to the time of the change of state of the set of fault information.

The anomaly detection model 15 can detect an anomaly when a deviation of the reconstructed operating parameters from the original sensor data, which corresponds to a degree of anomaly, exceeds a certain deviation size. As long as this is not the case, no fault can be detected. However, continuous monitoring of the degree of anomaly can be performed to detect a trend in the development of the degree of anomaly. This allows a prediction of the period of time after which a specified anomaly-degree threshold is exceeded by the degree of anomaly. This period of time can be adopted as the residual service life and signaled. In addition, the residual service life and the evaluated operating parameters F can be used as training data for the fleet classification model. Also, faults detected after an anomaly has occurred can also be assigned to the anomaly to create additional training data for the fleet classification model for retraining.

The degree of anomaly is of particular interest when a reliable residual service life cannot be determined in the central unit 2 based on the clustering method. In that case, an estimate of the residual service life can be made by extrapolating the increase in the degree of anomaly and estimating when a specified critical limit value will be reached. This point of intersection describes the predicted failure of the component or system.

What is claimed is:

1. A method for providing a residual service life based on a diagnosis of components of an electric drive system in a vehicle, comprising:
   recording a plurality of operating parameters, the plurality of operating parameters including at least one of (i) at least one sensor parameter measured by at least one sensor in the vehicle and (ii) at least one control parameter that is output to control one of the components of the electric drive system in the vehicle;
   determining distributions of the plurality of operating parameters;
   determining a plurality of fault information using a plurality of diagnostic models for a plurality of fault types, each of which is configured to detect a specific fault type in a specific one of the components of the electric drive system based on the distributions of at least some of the operating parameters of the plurality of operating parameters and provide corresponding fault information of the plurality of fault information associated with the specific fault type, the plurality of diagnostic models including at least one anomaly detection model configured to detect an anomaly in a behavior of the electric drive system based on the distributions of the at least some operating parameters of the plurality of operating parameters and to provide a corresponding degree of anomaly as the corresponding fault information, the plurality of diagnostic models including at least one physical diagnostic model configured to detect the fault in the specific one of the components of the electric drive system based on at least one of correlated distributions and redundant distributions of at least some of the plurality of operating parameters and to provide the corresponding fault information;
   determining the residual service life using a residual usage model depending on the plurality of fault information, the residual usage model configured to indicate the residual service life depending on the plurality of fault information, including depending on the corresponding degree of anomaly; and
   signaling the determined residual service life.

2. The method according to claim 1, wherein the plurality of diagnostic models comprise one or more data-based fault classification models, each of which is configured to detect the fault in the specific one of the components of the electric drive system based on a profile of the at least some operating parameters of the plurality of operating parameters and to provide the corresponding fault information.

3. The method according to claim 1, wherein the at least one anomaly detection models include an autoencoder configured to reduce a feature space of the plurality of operating parameters and reconstruct the plurality of operating parameters.

4. The method according to claim 3, wherein the corresponding degree of anomaly is determined depending on a deviation between the plurality of operating parameters and the reconstructed plurality of operating parameters.

5. The method according to claim 1, wherein:
   the corresponding fault information is assigned to a critical fault or a non-critical fault in a relevant component of the electric drive system, and
   when the critical fault is assigned an end of the service life is signaled.

6. The method according to claim 5, wherein:
   when the non-critical fault is assigned, timing information is assigned to the non-critical fault, which specifies when the non-critical fault occurred, the timing information is used for determining the residual service life, and the timing information is supplied to the residual usage model as an input variable.

7. The method according to claim 5, wherein:

the corresponding fault information is continuously transmitted to a central unit of one or a plurality of motor vehicles, and when the critical fault is assigned that indicates the end of the service life, one or more training datasets are generated which assigns the corresponding fault information of the plurality of diagnostic models to the residual service life.

8. The method according to claim 7, wherein:

the residual usage model is data-based and implemented as a neural network, and the residual usage model is retrained or updated with the one or more training datasets.

9. The method according to claim 7, wherein the residual usage model comprises a clustering procedure, which is based on a nearest neighbor approach and uses the one or more training datasets to determine the residual service life from currently supplied corresponding fault information.

10. The method according to claim 1, wherein a computer program product comprises commands which, during execution of the computer program product by least one data processing device, causes said at least one data processing device to execute the method.

11. The method according to claim 10, wherein the computer program product is stored on a non-transitory computer-readable storage medium.

12. An apparatus for providing a residual service life based on a diagnosis of components of an electric drive system in a vehicle, comprising:

at least one data processing device configured to:

record a plurality of operating parameters, the plurality of operating parameters including at least one of (i) at least one sensor parameter measured by at least one sensor in the vehicle and (ii) at least one control parameter that is output to control one of the components of the electric drive system, in the vehicle;

determine distributions of the plurality of operating parameters;

determine a plurality of fault information using a plurality of diagnostic models for a plurality of fault types, each of which is configured to detect a specific fault type in a specific one of the components of the electric drive system based on the distributions of at least some operating parameters of the plurality of operating parameters and provide corresponding fault information of the plurality of fault information associated with the specific fault type, the plurality of diagnostic models including at least one anomaly detection model configured to detect an anomaly in a behavior of the electric drive system based on the distributions of the at least some operating parameters of the plurality of operating parameters and to provide a corresponding degree of anomaly as the corresponding fault information, the plurality of diagnostic models including at least one physical diagnostic model configured to detect the fault in the specific one of the components of the electric drive system based on at least one of correlated distributions and redundant distributions of at least some of the plurality of operating parameters and to provide the corresponding fault information;

determine the residual service life using a residual usage model depending on the plurality of fault information, the residual usage model configured to indicate the residual service life depending on the plurality of fault information, including depending on the corresponding degree of anomaly; and signaling the residual service life.

* * * * *